United States Patent
Smith

(10) Patent No.: US 7,868,595 B1
(45) Date of Patent: Jan. 11, 2011

(54) APPARATUS AND METHOD FOR SOFT-START MODE TRANSITION IN A SWITCHING REGULATOR

(75) Inventor: Gregory J. Smith, Tucson, AZ (US)

(73) Assignee: National Semiconductor Corporation, Santa Clara, CA (US)

( * ) Notice: Subject to any disclaimer, the term of this patent is extended or adjusted under 35 U.S.C. 154(b) by 414 days.

(21) Appl. No.: 12/140,907

(22) Filed: Jun. 17, 2008

(51) Int. Cl.
G05F 1/656 (2006.01)
(52) U.S. Cl. .......................... 323/222; 323/224; 363/55
(58) Field of Classification Search .................. 323/222, 323/224, 225, 226, 271, 276, 282–288; 363/50, 363/55, 56.01, 56.02, 56.04, 60
See application file for complete search history.

(56) References Cited

U.S. PATENT DOCUMENTS

| | | | |
|---|---|---|---|
| 5,917,313 A | 6/1999 | Callahan, Jr. | |
| 6,100,677 A | 8/2000 | Farrenkopf | |
| 6,476,589 B2 * | 11/2002 | Umminger et al. | 323/282 |
| 6,515,880 B1 | 2/2003 | Evans et al. | |
| 6,683,441 B2 * | 1/2004 | Schiff et al. | 323/222 |
| 7,045,992 B1 * | 5/2006 | Silva et al. | 323/222 |
| 7,119,524 B2 * | 10/2006 | Bretz et al. | 323/274 |
| 7,129,679 B2 | 10/2006 | Inaba et al. | |
| 7,158,394 B2 | 1/2007 | Takahashi et al. | |
| 7,196,502 B2 | 3/2007 | Sugiura et al. | |
| 7,598,715 B1 * | 10/2009 | Hariman et al. | 323/271 |
| 7,764,054 B1 * | 7/2010 | Guo et al. | 323/224 |

OTHER PUBLICATIONS

Peterchev, A.V. et al., "Digital Multimode Buck Converter Control With Loss-Minimizing Synchronous Rectifier Adaptation," IEEE Transactions on Power Electronics, vol. 21, No. 6, Nov. 2006, pp. 1588-1599.
Mappus, S. "Predictive Gate Drive Boosts Synchronous DC/DC Power Converter Efficiency," Texas Instruments Corp., Application Report SLUA281, Apr. 2003, pp. 1-26.
Acker, B. et al. "Synchronous Rectification with Adaptive Timing Control," IEEE, vol. 1, Jun. 18-22, 1995, pp. 88-95.
LM2642, "Two-Phase Synchronous Step-Down Switching Controller," National Semiconductor, Feb. 2006, pp. 1-21.
LM2645, "Advanced Two-Phase Switching Controller with Two Linear Outputs," National Semiconductor, Apr. 2005, pp. 1-20.

* cited by examiner

*Primary Examiner*—Rajnikant B Patel
(74) *Attorney, Agent, or Firm*—Frommer Lawrence & Haug LLP; Matthew M. Gaffney

(57) ABSTRACT

A regulator is provided. The regulator is a PWM-based switching regulator with soft-start. The regulator starts up with non-synchronously-rectified regulation. A soft-start done signal is asserted after soft-start is finished. In one embodiment, the soft-start done signal is asserted at about 150% of the soft-start time. After the soft-start done signal has been asserted, the regulator changes from non-synchronously-rectified regulation to synchronously-rectified regulation if a pre-determined period of time occurs with no zero-crossing in the inductor current. In one embodiment, the pre-determined period of time is one switching cycle. In some embodiments, the "zero-crossing" of the inductor current is slightly different from zero, such as −0.5 A.

20 Claims, 4 Drawing Sheets

APPARATUS AND METHOD FOR SOFT-START MODE TRANSITION IN A SWITCHING REGULATOR

FIELD OF THE INVENTION

The invention is related to switching regulators, and in particular but not exclusively, to an apparatus and method for a DCM-to-CCM (discontinuous conduction mode to continuous conduction mode) transition in a PWM-based switching regulator.

BACKGROUND OF THE INVENTION

A switching regulator may be configured to provide an output voltage (Vout) in response to an input voltage (Vin). Typically, a switching regulator includes an inductor that is coupled to a switch. In operation, the inductor current is a triangle wave current based on the opening and closing of the switch, and an output capacitor stores charge to provide Vout from the inductor current. Also, the switch is controlled by a control signal, where the duty cycle or the frequency of the control signal is typically modulated based on negative feedback.

Additionally, a diode-rectified switching regulator employs a diode to rectify the inductor current. A synchronous switching regulator employs a synchronous switch rather than a diode. In a synchronous switching regulator, the inductor current can be positive or negative. Additionally, other topologies may be employed, such as a SEPIC or CUK topology.

BRIEF DESCRIPTION OF THE DRAWINGS

Non-limiting and non-exhaustive embodiments of the present invention are described with reference to the following drawings, in which.

DETAILED DESCRIPTION

Figure 1:
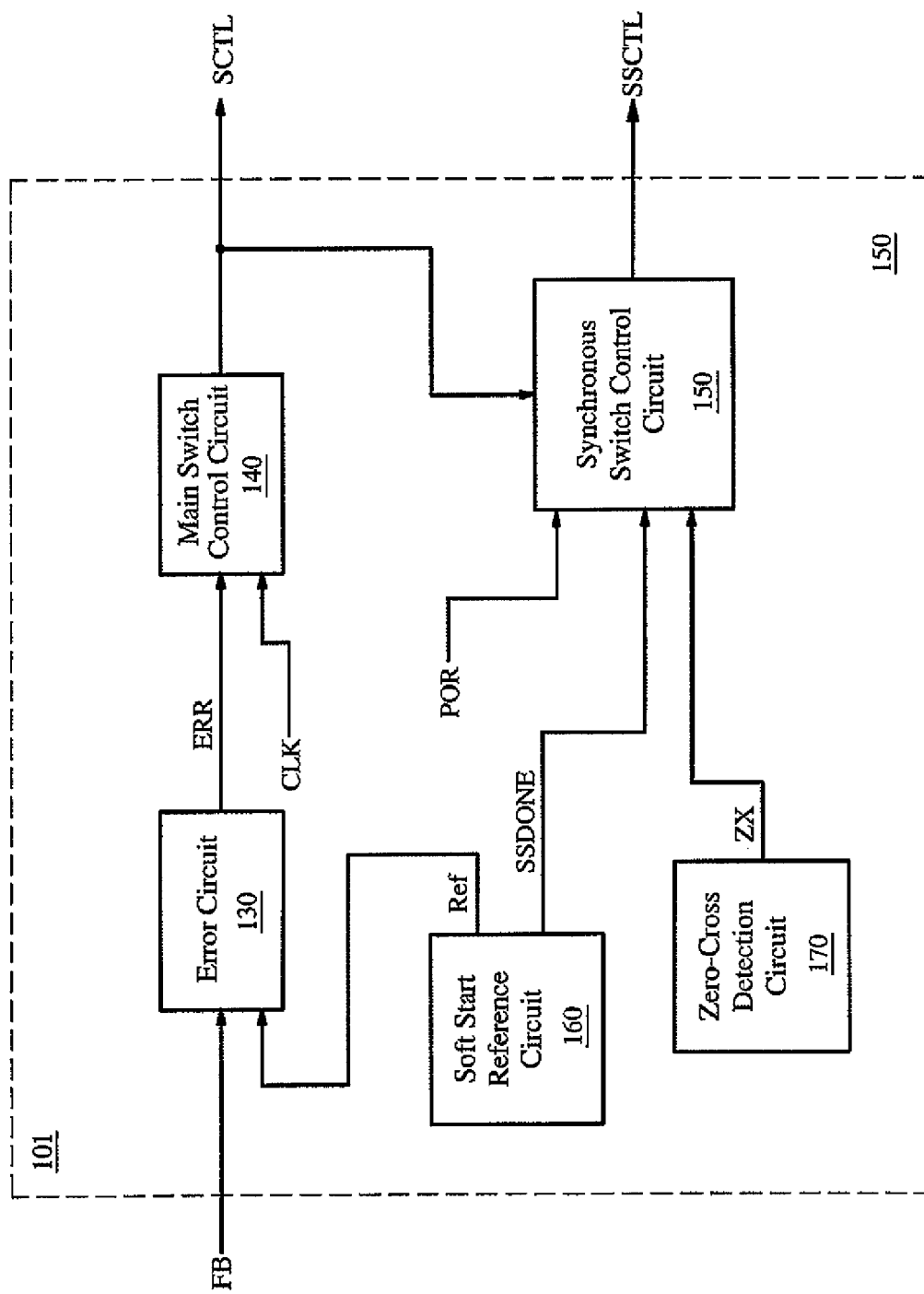
FIG. 1 shows a block diagram of an embodiment of a regulator controller.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. Similarly, the phrase "in some embodiments," as used herein, when used multiple times, does not necessarily refer to the same embodiments, although it may. As used herein, the term "or" is an inclusive "or" operator, and is equivalent to the term "and/or," unless the context clearly dictates otherwise. The term "based, in part, on", "based, at least in part, on", or "based on" is not exclusive and allows for being based on additional factors not described, unless the context clearly dictates otherwise. The term "coupled" means at least either a direct electrical connection between the items connected, or an indirect connection through one or more passive or active intermediary devices. The term "circuit" means at least either a single component or a multiplicity of components, either active and/or passive, that are coupled together to provide a desired function. The term "signal" means at least one current, voltage, charge, temperature, data, or other signal. Where either a field effect transistor (FET) or a bipolar junction transistor (BJT) may be employed as an embodiment of a transistor, the scope of the words "gate", "drain", and "source" includes "base", "collector", and "emitter", respectively, and vice versa.

Briefly stated, the invention is related to a regulator. The regulator is a PWM-based switching regulator with soft-start. The regulator starts up with non-synchronously-rectified regulation. A soft-start done signal is asserted after soft-start is finished. In one embodiment, the soft-start done signal is asserted at about 150% of the soft-start time. After the soft-start done signal has been asserted, the regulator changes from non-synchronously-rectified regulation to synchronously-rectified regulation if a pre-determined period of time occurs with no zero-crossing in the inductor current. In one embodiment, the pre-determined period of time is one switching cycle. In some embodiments, the "zero-crossing" of the inductor current is slightly different from zero, such as –0.5 A.

FIG. 1 shows a block diagram of an embodiment of regulator controller 101. Regulator controller 101 includes error circuit 130, main switch control circuit 140, synchronous switch control circuit 150, soft start reference circuit 160, and zero-cross detection circuit 170. Regulator controller 101 is arranged to control inductor-based switching regulation.

Error circuit 130 is arranged to provide error signal ERR based, in part, on a difference between feedback signal FB and reference signal Ref. Feedback signal FB is based, at least in part, on the regulated output of the regulation. In some embodiments, signal FB is the regulated output of the regulation.

Main switch control circuit 140 is arranged to provide switch control signal SCTL based, at least in part, on error signal ERR and clock signal CLK. Main switch control circuit 140 is arranged to perform pulse width modulation on error signal ERR. Main switch control circuit 140 may also include other functions such as over-current protection, and/or the like. Signal SCTL is used to control the main switch of the regulator.

Soft-start reference circuit 160 is arranged to provide reference signal Ref. Reference signal Ref is a soft-start reference voltage that ramps upward at power-up. Soft-start reference circuit 160 is arranged to asserted soft start done signal SSDONE after a pre-determined period of time. In one embodiment, signal SSDONE is asserted when soft-start is complete (e.g., when reference signal Ref reaches the steady-state reference voltage value).

In other embodiments, signal SSDONE is asserted after 150% of the soft start time. For example, in some embodiments, error circuit 130 receives soft-start reference signal Ref and a steady-state reference voltage (not shown), with the error circuit using the lesser of the soft-start reference signal and the steady-state reference voltage. This way, the soft-start voltage is used until the soft-start reference signal reaches the steady-state value, at which point the soft-start is complete. However, in one embodiment, signal Ref continues to ramp upward even after it reaches the steady-stated value. At this point, error circuit 130 uses the steady-state value rather than the soft-start reference. In one embodiment, when the soft-start reference reaches 150% of the steady-state voltage, signal SSDONE is asserted.

Zero-cross detection circuit 160 is arranged to detect zero-cross of the inductor current (as previously stated, regulator 101 controls inductor-based switching regulation), and to assert zero-cross signal ZX when a zero-crossing of the inductor current is detected. In one embodiment, the "zero-crossing" is literal, so that a zero-crossing is detected when the inductor current reaches zero. In other embodiments, the cross is near zero but slightly different than zero. For example, in some embodiments, a zero-cross of the inductor current is detected when the inductor current reaches –0.5 A.

In other words, zero-cross detection circuit 160 is arranged to assert zero-cross signal ZX if the inductor current is less than or equal to a pre-determined current level, where the pre-determined current level is zero or relatively near zero.

In various embodiments, zero-cross detect circuit 160 may detect zero-crossing of the inductor current in different ways. In some embodiments, zero-cross detect circuit 160 senses the inductor current via a sense-resistor, DCR sensing, and/or the like. In other embodiments, zero-cross detect circuit detects zero-crossing by monitoring the switch node of the regulator.

Synchronous switch control circuit 150 is arranged to provide synchronous switch control signal SSCTL based on signals SCTL, power-on reset (POR), SSDONE, and ZX. Signal SSCTL is used to control the synchronous switch of the regulator. Signal POR is asserted at power-up, which is the beginning of soft-start.

During soft-start, synchronous switch control circuit 150 controls signal SSCTL such that regulator 101 controls non-synchronously-rectified regulation of the output voltage. During non-synchronously-rectified regulation, the regulation may be switched from non-synchronously-rectified regulation to synchronously-rectified regulation as follows. During non-synchronously-rectified regulation, if signal SSDONE is asserted, and signal ZX is not asserted for a pre-determined period of time, synchronous switch control circuit 150 provides signal SSCTL such that the regulation is changed from non-synchronously-rectified regulation to synchronously-rectified regulation.

In synchronously-rectified regulation, whenever the main switch is on, the synchronous switch is off, and vice versa. However, there is typically a break-before-make scheme so that both switches are off for a very brief period of time, to ensure that both switches are not both on at the same time.

In non-synchronously-rectified regulation, the synchronous switch cannot be on when the inductor current is below zero. In some embodiments, an inductor current value near zero, but not exactly zero is used, such as –0.5 A. In one embodiment, the synchronous switch is off whenever the main switch is on, and the synchronous switch is on whenever the main switch is off and the inductor current is greater than –0.5 A.

Figure 2:
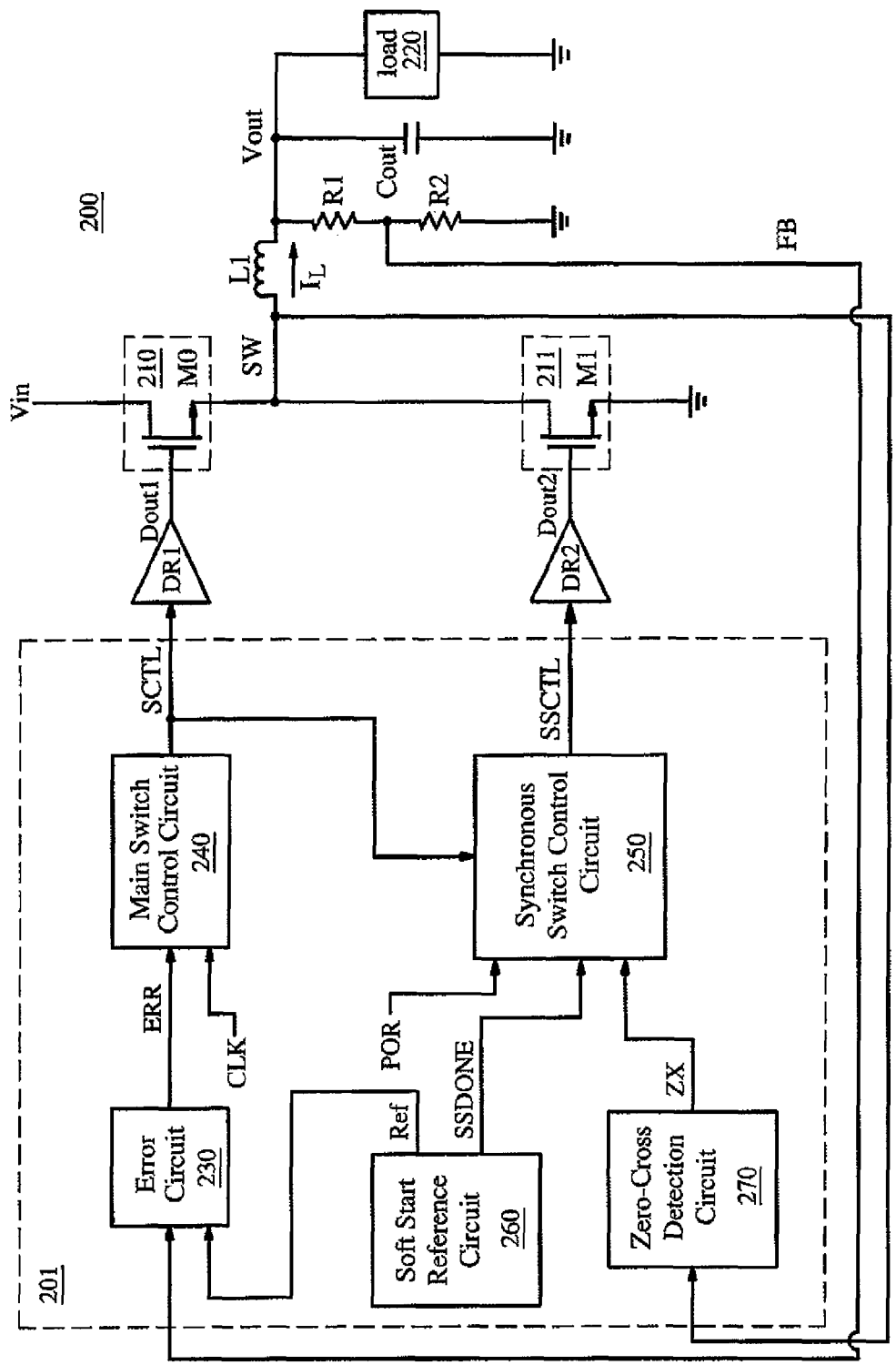
FIG. 2 illustrates a block diagram of an embodiment of a regulator driving a load, where the regulator includes an embodiment of the regulator controller of FIG. 1.

FIG. 2 illustrates a block diagram of an embodiment of regulator 200 driving load 220, where regulator 200 includes an embodiment of regulator controller 201, which may be employed as an embodiment of regulator controller 101 of FIG. 1. FIG. 2 illustrates a buck regulator embodiment. However, the invention is not limited to buck regulators. In other embodiments, various other topologies may be employed, such as boost, buck-boost, inverting, SEPIC, CUK, and/or the like.

Regulator 200 includes regulator controller 201, driver DR1, driver DR2, inductor L1, resistor R1, resistor R2, output capacitor Cout, main switch 210, and synchronous switch 211. Main switch 210 includes transistor M0. Synchronous switch 211 includes transistor M1.

Driver D1 is arranged to provide driver output signal DOUT1 to drive transistor M0 based on switch control signal SCTL. Similarly, driver D2 is arranged to provide driver output signal DOUT2 to drive transistor M1 based on synchronous switch control signal SSCTL. Inductor current L1 is arranged to provide inductor current $I_L$ based on the voltage drop across it. Capacitor Cout is arranged to provide output voltage Cout based, in part, on inductor current $I_L$. Resistors R1 and R2 are arranged as a voltage divider to provide feedback voltage FB from output voltage Vout. Zero-cross detection circuit ZX is arranged to receive switch node voltage SW.

Typically, during synchronously-rectified regulation, regulator 200 operates in continuous conduction mode (CCM), and during non-synchronously-rectified regulation, regulator 200 operates in discontinuous conduction mode (DCM). Accordingly, the transition from non-synchronously-rectified regulation to synchronously-rectified regulation is also a transition from DCM to CCM.

Figure 3:
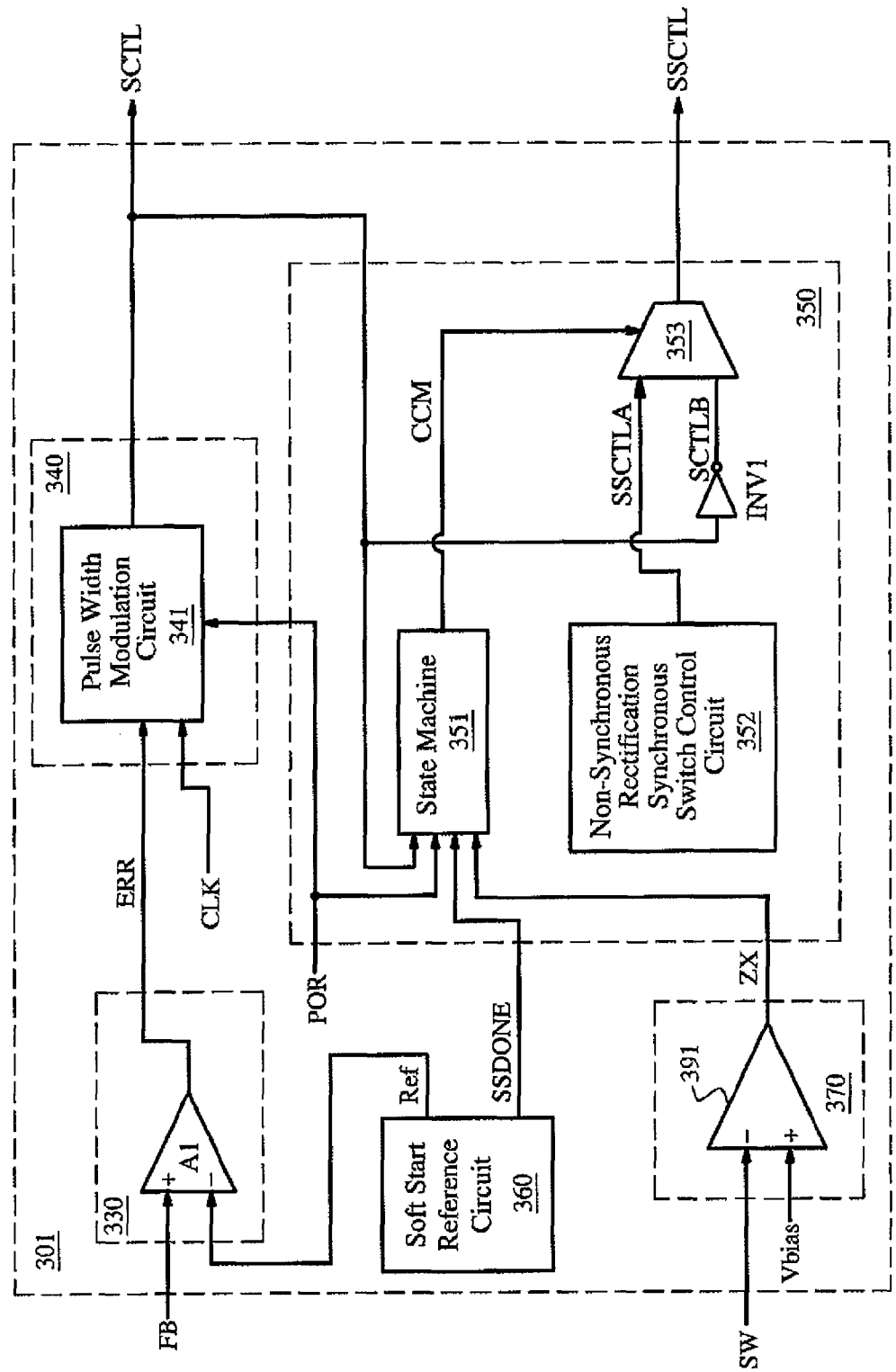
FIG. 3 shows a block diagram of an embodiment of the regulator controller of FIG. 2.

FIG. 3 shows a block diagram of an embodiment of the regulator controller 301, which may be employed as an embodiment of switching regulator 201 of FIG. 2. Error circuit 330 includes error amplifier A1. Main switch control circuit 340 includes pulse width modulation circuit 341. Zero-cross detect circuit 370 includes comparator 391. Synchronous switch control circuit 350 includes state machine 351, non-synchronous rectification synchronous switch control circuit 352, inverter INV1, and multiplexer 353.

Error amplifier A1 is an error amplifier that receives feedback voltage FB and reference voltage Ref and provide error signal ERR. Although FIG. 3 illustrates voltage-mode regulation, in other embodiments, current-mode regulation may be employed. Pulse-width modulation circuit 341 is arranged to perform pulse-width modulation on error signal ERR to provide switch control signal SCTL. Comparator 391 is arranged to compare switch node voltage SW with bias voltage Vbias. In one embodiment, bias voltage Vbias is about 10 mV.

Inverter INV1 is arranged to provide signal SCTLB from signal SCTL by inverting signal SCTL. Non-synchronous rectification synchronous switch control circuit 352 is arranged to provide signal SSCTLA, which is the signal to be used for signal SSCTL during non-synchronous rectification. In some embodiments, signal SSCTLA is simply 0V so that the synchronous switch remains open throughout non-synchronous rectification. In other embodiments, during non-synchronous rectification, the synchronous switch is off whenever the main switch is on, and the synchronous switch is on whenever the main switch is off and the inductor current is greater than a pre-determined current value that is at or relatively near zero.

Multiplexer 353 is arranged to provide signal SSCTL based on multiplexing of signals SSCTLA and SCTLB, where the multiplexing is done based on signal CCM. If signal CCM is asserted, then signal SCTLB is provided as signal SSCTL. Alternatively, if signal CCM is not asserted, then signal SSCTLA is provided as signal SSCTL.

State machine 351 is arranged to provide signal CCM based on signals SCTL, POR, SSDONE, and ZX. In some embodiments, state machine 351 operates as follows. When signal POR is asserted, signal CCM is de-asserted. If signal CCM is de-asserted, then signal CCM is asserted if signal SSDONE is asserted, and for a pre-determined period of time after SSDONE is asserted, signal ZX is not asserted. In one embodiment, the pre-determined period of time is one switching cycle of the switching regulation (i.e. one cycle of signal CLK). In other embodiments, the pre-determined period of time may be two or more switching cycles.

As discussed above, non-synchronously-rectified regulation is used at power-on reset. However, in some embodiments, there may be other conditions, such as fault conditions, when regulation is changed from synchronously-rectified regulation to non-synchronously-rectified regulation. In these embodiments, transitioning from non-synchronously-rectified regulation to synchronously-rectified regulation happens in a similar manner—i.e., when signal SSDONE is asserted, and one full switching cycle occurs with no zero-cross of the inductor current.

In some embodiments, a fault condition such as an over-current protection condition causes a reset, in which the regulator controller re-starts, and soft-start resumes again with the reference voltage ramping upward from 0V. In these embodiments, when the reset occurs, the regulation is changed from synchronously-rectified regulation to non-synchronously-rectified regulation, and the start-up proceeds in the same way as a power-on reset. In other embodiments, a fault condition such as an over-current protection event instead causes frequency-foldback to occur. In these embodiments, when the frequency-foldback begins, the regulation changes from non-synchronously-rectified regulation to synchronously-rectified regulation. During frequency-foldback, the switching frequency and the reference voltage are decreased as long as the fault condition remains, and gradually incremented when the fault condition is no longer detected. When the fault condition ends, in some of these embodiments, signal SSDONE is asserted when reference voltage returns to its steady-state value. In other embodiments, signal SSDONE is asserted when the soft-start voltage reaches 150% of the steady-state value.

In some embodiments, in response to a fault condition such as an over-current protection condition, the frequency is not adjusted, but the reference voltage is decreased as long as the fault condition remains, and the reference voltage is gradually incremented when the fault condition is no longer detected. In these embodiments, reference voltage foldback occurs but frequency-foldback does not occur. In other embodiments, both reference voltage foldback and frequency-foldback occur.

Figure 4:
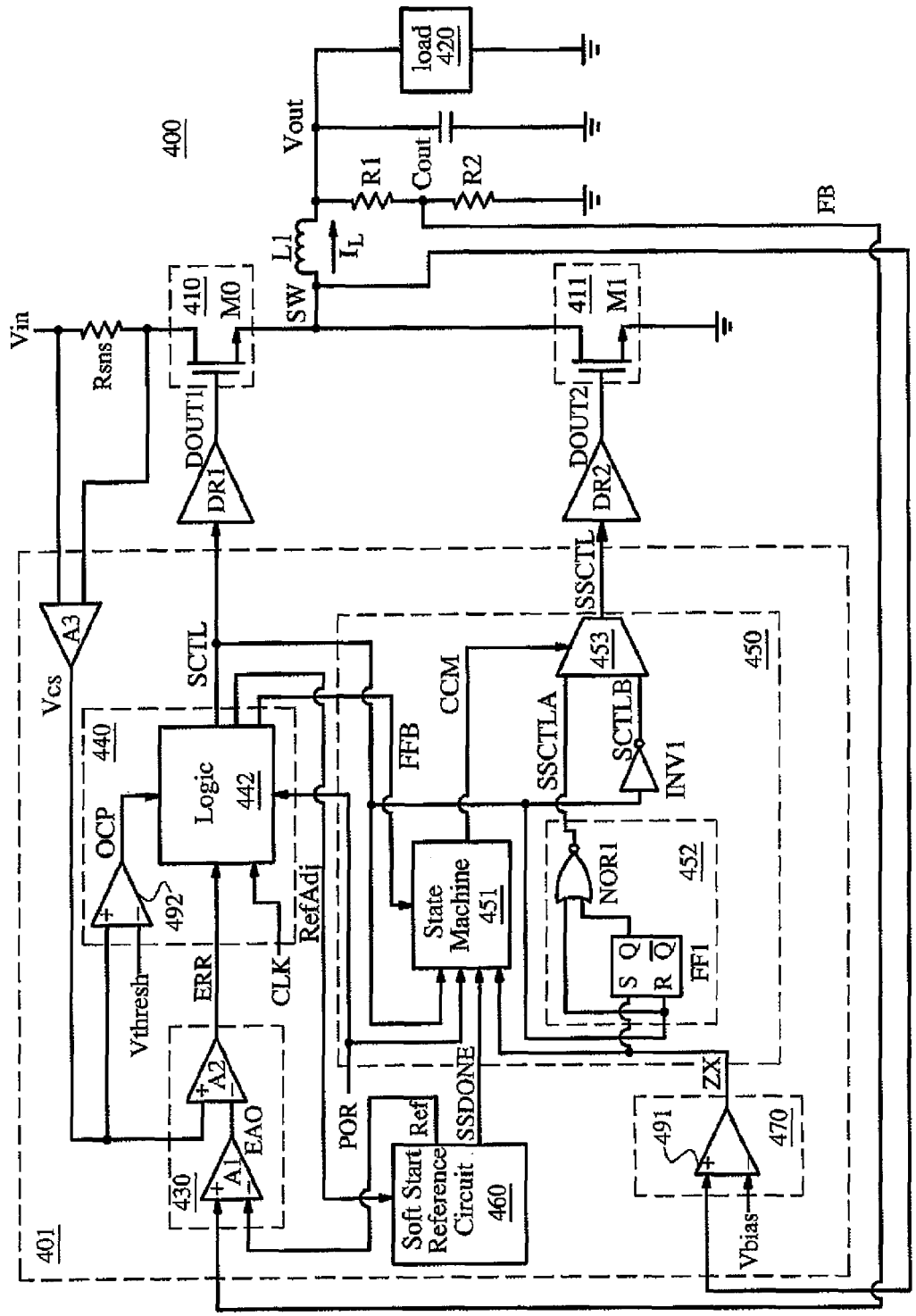
FIG. 4 illustrates a block diagram of an embodiment of a regulator driving a load, where the regulator includes the regulator controller of FIG. 3, arranged in accordance with aspects of the present invention.

One embodiment of regulator controller 301 in which frequency-foldback is employed is illustrated in FIG. 4 below.

FIG. 4 illustrates a block diagram of an embodiment of regulator 400, which is an embodiment of regulator 200, and which includes regulator controller 401, which may be employed as an embodiment of regulator controller 301 of FIG. 3. Regulator 400 further includes sense resistor Rsns. Regulator controller 401 further includes current sense amplifier A3. Error circuit 430 further includes amplifier A2. Main switch control circuit 440 includes logic 442 and comparator 492. Non-synchronous rectification synchronous switch control circuit 452 includes SR flip-flop FF1 and NOR gate NOR1.

Sense resistor Rsns is arranged to sense the current through main switch 410. Voltage sense amplifier A3 is arranged to amplify the voltage across sense resistor Rsns to provide current sense voltage Vcs.

In the embodiment illustrated in FIG. 4, error circuit 430 is arranged such that regulator 400 is a current-mode regulator. Although FIG. 4 illustrates current-mode regulation, in other embodiments, voltage-mode regulation may be employed.

Comparator 492 is arranged to compare threshold voltage Vthreshold with current-sense voltage Vcs to provide over-current protection signal OCP, such that signal OCP is asserted when an over-current protection event has occurred.

During normal operation, logic block 442 provides switch control signal SCTL by performing pulse width modulation on error signal ERR. However, during sort-start, and during an over-current event, logic block 442 adjusts the frequency of signal SCTL and controls (via signal RefAdj) soft-start reference circuit 460 to adjust the reference voltage Ref. Logic block 442 asserts frequency-foldback signal FFB when a frequency-foldback condition occurs.

In one embodiment, logic block 442 includes a counter or a digital state machine operating in part like a counter to provide a count value that is employed for both pulse skipping and to control the soft-start voltage.

For example, in one embodiment, the counter is a four-bit counter that operates as follows. The counter counts downward from 1111 to 0000 beginning at power-up. In this case, the count value represents the reference voltage attenuation. The soft-start voltage may be provided by a DAC based on the count. At 1111, Vref is $1/16$ of the steady state value; at 1110, Vref is at $2/16$ of the steady state value; and so on. Also, the value of the counter is number of pulses that logic block 442 skips. For example, when Vref is at $1/16$ of the steady state value, 15 out of every 16 pulses are skipped; when Vref is at $2/16$ of the steady state value, 14 out of every 16 pulses are skipped; and so on. However, the same number of bits need not be used for both pulse skipping and the reference voltage ramp. For example, in one embodiment, the digital state machine increments 16 levels of pulse skipping as the soft-start reference voltage increments through 128 levels. In this way, the voltage ramp is relatively smooth. In one embodiment, when Vref is at $1/8$ of the steady state value, 7 out of every eight pulses are skipped.

In one embodiment, the counter is 8 bits and Vref provided as the output of DAC 211 goes beyond the steady-state reference voltage. In this embodiment, error amplifier 230 has three references: an external soft-start voltage, the soft-start Vref based on the output of the DAC, and a steady-state reference voltage, and whichever reference is lowest is used by error amplifier 230. In one embodiment, when the external soft-start voltage reaches 150% of the steady-state reference voltage, signal SSDONE is asserted.

In one embodiment, the count value is used to control the transconductance (gm) of error amplifier A1. This way, the bandwidth of the compensator does not exceed the startup switching frequency, which could otherwise result in instability. In one embodiment, three bits of the counter are used for the gm control of error amplifier 230.

In one embodiment, as illustrated in FIG. 4, switching regulator 400 is a current-mode PWM regulator. If the on-time of a pulse in signal SCTL is too low, high-side sense current mode control can result in erratic switching behavior. However, pulse skipping performed by logic block 442 ensures that the on-time of pulses in signal SCTL are large enough to allow current sense voltage Vcs to settle and for blanking of switching noise so that erratic switching behavior does not result.

An over-current event, as indicated by the assertion of signal OCP, is responded to in a dynamic manner. In one embodiment, the counter (state machine) is immediately decremented by over-current events and slowly incremented between over-current events as in soft-start. Accordingly, in this embodiment, light over-current events only reduce output voltage Vout slightly and for short durations relative to a hard short event which, in the extreme, results in effectively creating a full soft-start recovery. In both a soft-start and a response to an over-current event, the on-time of pulses in signal SCTL are substantially constant.

State machine 451 is arranged to de-asserted signal CCM if either signal POR or signal FFB is asserted.

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A circuit for regulation, comprising:
   a switching regulator controller that is arranged to control a main switch and a synchronous switch to control regulation of an output voltage, wherein the switching regulator includes:
   an error circuit that is arranged to provide an error signal that is based, in part, on a difference between a feedback signal and a reference voltage, wherein the feedback signal is based, at least in part, on an output voltage;
   a main switch control circuit that is arranged to provide a switch control signal based, in part, on the error signal;
   a zero-cross detection circuit that is arranged to provide a zero-cross detect signal, and to assert the zero-cross signal if an inductor current associated with the regulation of the output voltage is less than or equal to a pre-determined current level, wherein the pre-determined current level is zero or relatively near zero; and
   a synchronous switch control circuit that is arranged to provide a synchronous switch control signal such that the synchronous switch control signal is based, in part, on the switch control signal, and such that:
   during soft-start, the synchronous switch control circuit controls a synchronous switch such that the switching regulator controller controls non-synchronously-rectified regulation of the output voltage; and
   during non-synchronously-rectified regulation, if a soft-start done signal is asserted, and the zero-cross signal is not asserted for a pre-determined period of time, controlling the synchronous switch such that the regulation is changed from non-synchronously-rectified regulation to synchronously-rectified regulation.

2. The circuit of claim 1, wherein
the synchronous switch control circuit is further arranged to provide the synchronous switch signal control such that:
   if reference voltage fold-back occurs, the synchronous switch control circuit controls the synchronous switch such that the regulation is changed to non-synchronously-rectified regulation.

3. The circuit of claim 1, wherein
the pre-determined period of time is one switching cycle of the switch control signal.

4. The circuit of claim 1, wherein
the main switch control circuit is arranged to provide the switch control signal based, at least in part, on performing pulse width modulation on the error signal.

5. The circuit of claim 1, wherein
the zero-cross detection circuit includes a comparator.

6. The circuit of claim 1, wherein
the zero-cross detection circuit is arranged to compare a switch node voltage with a bias voltage, wherein the bias voltage is less than about 300 milliVolts.

7. The circuit of claim 1, wherein the pre-determined level is about –0.5 Amperes.

8. The circuit of claim 1, wherein
the error circuit includes:
   an error amplifier having at least a first input, a second input, and an output, wherein the error amplifier is arranged to receive the feedback voltage at the first input, and to receive the reference voltage at the second input.

9. The circuit of claim 8, wherein
the error circuit further includes:
   an amplifier having at least a first input, a second input, and an output, wherein the amplifier is arranged to receive a current sense signal at the first input of the amplifier, and to provide the error signal at the output of the amplifier; and wherein the second input of the amplifier is coupled to the output of the error amplifier.

10. The circuit of claim 1, further comprising:
the main switch, wherein the main switch is coupled to a switch node, and wherein the main switch has at least a control input that is coupled to the switch control circuit.

11. The circuit of claim 10, wherein
the zero-cross detection circuit is a comparator having at least a first input, a second input, and an output; the first input of the comparator is coupled to the switch node, the second input of the comparator is coupled to a bias voltage that is less than 300 milliVolts; and wherein the zero-cross detection circuit is arranged to provide the zero-cross signal at the output of the zero-cross detection circuit.

12. The circuit of claim 1, further comprising:
a soft-start reference voltage circuit, wherein the soft-start reference voltage circuit is arranged to provide a soft-start reference voltage to the error circuit; the soft-start reference voltage circuit is arranged to provide the soft-start done signal; the soft-start reference circuit is arranged to provide the soft-start reference voltage such that, during the soft-start, the soft-start reference voltage ramps upward toward the reference voltage; the soft-start is over when the soft-start reference voltage reaches the reference voltage; and wherein the error circuit employs the soft-start reference voltage rather than the reference voltage when the soft-start reference voltage is less than the reference voltage.

13. The circuit of claim 12, wherein
the soft-start reference voltage circuit is further arranged to decrease the soft-start reference voltage during a fault condition.

14. The circuit of claim 12, wherein
the soft-start reference voltage circuit is arranged to assert the soft-start done signal when the soft-start reference voltage reaches the reference voltage.

15. The circuit of claim 12, wherein the soft-start reference voltage circuit is arranged to assert the soft-start done signal when the soft-start reference voltage reaches approximately 150% of the reference voltage.

16. A method for regulation, comprising:

converting an input voltage into an output voltage such that the output voltage is regulated, including:

providing an error signal that is based, in part, on a difference between a feedback signal and a reference voltage, wherein the feedback signal is based, at least in part, on an output voltage;

providing a zero-cross detect signal if an inductor current associated with an inductor is less than or equal to a pre-determined current level, wherein the pre-determined current level is zero or relatively near zero, and wherein the inductor is coupled to a switch node;

providing a switch control signal that is based, in part, on the error signal;

opening and closing a main switch based on the switch control signal, wherein the main switch is coupled to the switch node; and controlling a synchronous switch such that:

during a soft-start, the regulation of the output voltage is non-synchronously-rectified regulation; and during the non-synchronously-rectified regulation of the output voltage:

if a soft-start done signal is asserted, and the zero-cross signal is not asserted for a pre-determined period of time:

changing the regulation of the output voltage from non-synchronously-rectified regulation to synchronously-rectified regulation.

17. The method of claim 16, wherein controlling the synchronous switch is further accomplished that:

if reference voltage fold-back occurs, changing the regulation of the output voltage to non-synchronously-rectified regulation.

18. The method of claim 16, wherein providing the zero-cross detect signal includes comparing a switch node voltage at the switch node with a bias voltage, wherein the bias voltage is less than about 300 milliVolts.

19. The method of claim 16, further comprising:

providing a soft-start reference voltage, wherein providing the error signal is based on the soft-start reference voltage rather than the reference voltage if the soft-start reference voltage is less than the reference voltage, and wherein the soft-start voltage ramps upward toward the reference voltage during the soft-start; and asserting the soft-start done signal when the soft-start reference voltage reaches the reference voltage.

20. The method of claim 16, further comprising:

providing a soft-start reference voltage, wherein providing the error signal is based on the soft-start reference voltage rather than the reference voltage if the soft-start reference voltage is less than the reference voltage, and wherein the soft-start voltage ramps upward toward the reference voltage during the soft-start; and asserting the soft-start done signal when the soft-start reference voltage reaches approximately 150% of the reference voltage.

\* \* \* \* \*